United States Patent [19]
Abe et al.

[11] Patent Number: 5,538,697
[45] Date of Patent: Jul. 23, 1996

[54] ADSORBENT-CATALYST FOR EXHAUST GAS PURIFICATION, ADSORBENT FOR EXHAUST GAS PURIFICATION, SYSTEM FOR EXHAUST GAS PURIFICATION, AND METHOD FOR EXHAUST GAS PURIFICATION

[75] Inventors: Fumio Abe, Handa; Takashi Harada, Nagoya; Masato Ogawa, Komaki, all of Japan

[73] Assignee: NGK Insulators, Ltd., Japan

[21] Appl. No.: 361,500

[22] Filed: Dec. 22, 1994

[30] Foreign Application Priority Data

Dec. 28, 1993 [JP] Japan ................................ 5-337546
Nov. 7, 1994 [JP] Japan ................................ 6-272035

[51] Int. Cl.$^6$ ........................ B01D 53/34; F01N 3/28
[52] U.S. Cl. ........................ 422/171; 422/169; 422/177; 422/180; 422/211; 422/222; 422/174; 422/199; 423/213.7; 423/212; 60/297; 60/294; 502/527
[58] Field of Search .................. 472/169, 171–172, 472/176, 177, 199, 180, 211, 222; 423/212, 213.7, 213.5; 60/274, 299, 283, 285, 297; 502/439, 527

[56] References Cited

U.S. PATENT DOCUMENTS

| | | | |
|---|---|---|---|
| 5,067,319 | 11/1991 | Moser | 422/171 |
| 5,112,790 | 5/1992 | Watanabe et al. | 423/213.5 |
| 5,125,231 | 6/1992 | Patil et al. | 60/297 |
| 5,315,824 | 5/1994 | Takeshima | 60/297 |

FOREIGN PATENT DOCUMENTS

| | | |
|---|---|---|
| 2103647 | 2/1994 | Canada . |
| 485179 | 5/1992 | European Pat. Off. . |
| 5-31359 | 2/1993 | Japan . |
| 0559942 | 3/1993 | Japan . |

OTHER PUBLICATIONS

Cold–Start Hydrocarbon Collection for Advanced Exhaust Emission Control, Martin J. Heimrich et al., *Society of Automotive Engineers*, Paper No. 920847, 1992, pp. 1–12.

*Primary Examiner*—Robert J. Warden
*Assistant Examiner*—Hien Tran
*Attorney, Agent, or Firm*—Parkhurst, Wendel & Burr

[57] ABSTRACT

An adsorbent-catalyst for exhaust gas purification, has a honeycomb structure having a large number of passages divided by partition walls, substantially parallel to the flow direction of an exhaust gas to be purified, an adsorbent layer having a hydrocarbon adsorbability, supported on the honeycomb structure, and a catalyst layer having a three-way catalytic activity or an oxidizing ability, supported on the honeycomb structure, in which adsorbent-catalyst the adsorbent layer and the catalyst layer are separately supported on the honeycomb structure in all or part of the cross sections of the adsorbent-catalyst perpendicular to the flow direction of the exhaust gas.

46 Claims, 12 Drawing Sheets

ADSORBENT-CATALYST FOR EXHAUST GAS PURIFICATION, ADSORBENT FOR EXHAUST GAS PURIFICATION, SYSTEM FOR EXHAUST GAS PURIFICATION, AND METHOD FOR EXHAUST GAS PURIFICATION

BACKGROUND OF THE INVENTION AND THE RELATED ART

The present invention relates to a system for exhaust gas purification and a method for exhaust gas purification, both used for effectively purifying harmful substances present in an exhaust gas, particularly hydrocarbons (HC) and the like generated in large amounts during the cold start of an engine.

In the FTP test (LA-4 mode) conducted in connection with the intensified exhaust gas regulation of the United States, 70 to 80% of the total HC emission amount is emitted within 140 seconds (within the first hill of Bag 1) during the cold start of an engine after engine cranking. During this period, however, considerable time passes until a conventional three-way catalyst reaches its operational temperature, and most of the HC is therefore exhausted without being purified.

In order to solve this problem, techniques were proposed in which an electrically-heated catalyst (hereinafter referred to as an EHC) and/or an adsorbent comprising zeolite as the main active component, is disposed in an exhaust pipe.

For example, Japanese Patent Application Laid-Open No. 31359/1993 discloses a catalytic converter for car exhaust gas purification in which three elements of an EHC, an adsorbent and a main catalyst are arranged in series in any desired order in an exhaust gas flow path.

SAE Paper No. 920847 proposes a by-pass system in which a valve is provided at the upstream side of an adsorbent so as to desorb the HC adsorbed on the adsorbent, after a catalyst has been sufficiently activated.

However, in Japanese Patent Application Laid-Open No. 31359/1993, no mention is made on the optimum arrangement of the above-mentioned three elements for the decrease of emissions during cold start and, moreover, fails to consider reducing of the electric power to be applied to the EHC.

The technique employing such a by-pass system as mentioned in the SAE Paper No. 920847 is satisfactory in the purification performance, but it has many problems in practical application. For example, this system is intricate and the valve in the exhaust pipe has low heat-resistance.

SUMMARY OF THE INVENTION

The present invention has been made in view of the above-mentioned problems of conventional techniques.

The object of the present invention is to provide an adsorbent-catalyst for exhaust gas purification, an adsorbent for exhaust gas purification, a system for exhaust gas purification and a method for exhaust gas purification, all used for effectively purifying the harmful substances present in an exhaust gas, particularly HC and the like generated in large amounts during the cold start of an engine, without employing any intricate system such as the above-mentioned by-pass system or the like.

According to the present invention there is provided an adsorbent-catalyst for exhaust gas purification, comprising:

a honeycomb structure having a large number of passages divided by partition walls, substantially parallel to the flow direction of an exhaust gas to be purified, an adsorbent layer having a hydrocarbon adsorbability, supported on the honeycomb structure, and a catalyst layer having a three-way catalytic activity or an oxidizing ability, supported on the honeycomb structure, in which adsorbent-catalyst the adsorbent layer and the catalyst layer are separately supported on the honeycomb structure in all or part of the cross sections of the adsorbent-catalyst perpendicular to the flow direction of the exhaust gas.

The present invention further provides an adsorbent for exhaust gas purification, comprising:

a honeycomb structure having a large number of parallel passages divided by partition walls, and an adsorbent layer having a hydrocarbon adsorbability, supported on the honeycomb structure, wherein a blowing-through portion is formed in the honeycomb structure so as to allow for the blowing of an exhaust gas through the portion.

The present invention further provides a system for exhaust gas purification, provided in an exhaust pipe, which comprises:

at least one adsorbent-catalyst mentioned above, and a catalyst comprising a honeycomb structure and a catalyst layer supported thereon, provided at the downstream side of the adsorbent-catalyst in the flow direction of an exhaust gas to be purified.

The present invention further provides a system for exhaust gas purification, provided in an exhaust pipe, which comprises:

at least one adsorbent mentioned above, and a catalyst comprising a honeycomb structure and a catalyst layer supported thereon, provided at the downstream side of the adsorbent in the flow direction of an exhaust gas to be purified.

The present invention further provides a method for exhaust gas purification by the use of the system mentioned above, which comprises allowing the adsorbent layer of the adsorbent-catalyst or adsorbent of the system to adsorb the exhaust gas, particularly the hydrocarbon components, etc. generated during the cold start of an internal combustion engine; desorbing the adsorbed components from the adsorbent layer as the temperature of the adsorbent layer is increased by the exhaust gas; for some time in the above process from the adsorption to the desorption, adding an oxidizing gas to the exhaust gas or adjusting the ratio of the amounts of the air for combustion and the fuel fed, to make the exhaust gas oxygen-excessive and burn the desorbed hydrocarbons, etc. on the catalyst layer of the adsorbent-catalyst or catalyst of the system.

In the present invention, the honeycomb structure refers to a structure having a large number of parallel passages divided by partition walls and includes even a flat plate type.

DETAILED DESCRIPTION OF THE INVENTION

Figure 1:
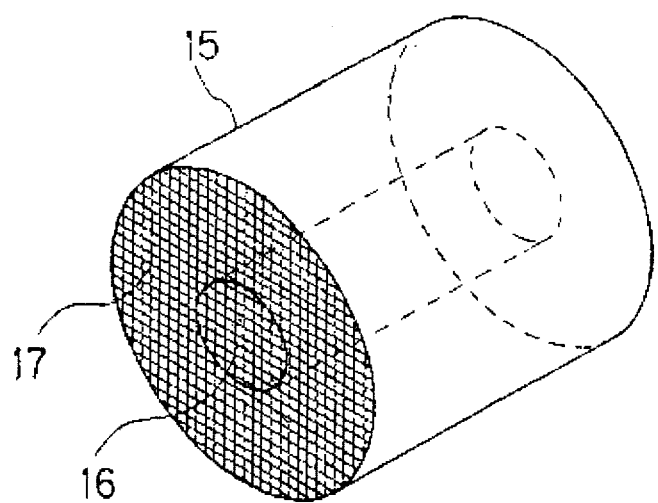
FIG. 1 to FIG. 7 are each a view showing an example of the adsorbent-catalyst according to the present invention.

The basic principle of the present invention is described.

In general, when an adsorbent and a catalyst are provided in an exhaust pipe with the adsorbent placed at the upstream side of the catalyst in the flow direction of an exhaust gas, first the adsorbent is heated by the exhaust gas and then the catalyst is heated, during the cold start of an engine; therefore, the temperature elevation of the adsorbent takes place always earlier than that of the catalyst. As a result, when the adsorbent layer of the adsorbent satisfactorily adsorbs HC and then begins to desorb the adsorbed HC (the adsorbent temperature at this time is about 80°–100° C.), the catalyst provided at the downstream side of the adsorbent has not yet reached its ignition temperature (lower than 100° C.), and the HC desorbed from the adsorbent is discharged out of the exhaust pipe without being purified. Even when the adsorbent layer of the adsorbent contains a catalyst component, the efficiency of HC purification is insufficient. In the present invention, however, a particular adsorbent-catalyst or a particular adsorbent is used, whereby the catalyst provided at the downstream side of the adsorbent-catalyst or the adsorbent can be heated quickly and the HC desorbed from the adsorbent-catalyst or the adsorbent can be purified efficiently.

The basic principle of the present invention is described for the case of using the particular adsorbent-catalyst. During the engine idling at the start when HC is generated in the largest amount, the flow amount of exhaust gas is small and the exhaust gas flows into the front face of the adsorbent-catalyst relatively uniformly; consequently, a large proportion of the HC present in the exhaust gas is adsorbed on the adsorbent layer portion (hereinafter referred to as the adsorbent portion) of the adsorbent-catalyst. During the following acceleration stage, the amount of the exhaust gas generated is large. In order to allow a large proportion of the exhaust gas to pass, during this acceleration stage, through the catalyst layer portion (hereinafter referred to as the catalyst portion) of the adsorbent-catalyst, it is preferable to employ an appropriate pipe structure or to provide an appropriate guide for exhaust gas flow just in front of or just behind of the adsorbent-catalyst.

An approach may be taken in which the length of at least part of the catalyst portion in the flow direction of exhaust gas is made smaller than that of the adsorbent portion in the same direction. Also, there may be taken an approach in which the open frontal area of at least part of the catalyst portion is made larger than that of the adsorbent portion. Herein, the open frontal area refers to the proportion of the total cross-sectional area of the passages divided by partition walls, i.e. the total gas-passable area to the cross-sectional area of the honeycomb structure. In order to slow down the temperature elevation of the adsorbent layer (retard the timing of the start of HC desorption), there may be taken an approach in which the heat capacity of the adsorbent portion is made larger than that of the catalyst portion by any appropriate method.

By employing at least one of these approaches, the adsorbent portion of the adsorbent-catalyst is less liable to be heated by the exhaust gas or has a structure less susceptible to temperature elevation, even in the engine acceleration stage; as a result, the adsorption portion can continue adsorption of HC for a certain period until the desorption of the adsorbed HC begins.

Meanwhile, the catalyst portion of the adsorbent-catalyst is quickly heated by the above-mentioned approaches, is ignited at an early stage, and generates a lot of reaction heat. The reaction heat reliably ignites, by convection and conduction, the catalyst provided at the downstream side of the adsorbent-catalyst. That is, the temperature elevation of the adsorbent portion of the adsorbent-catalyst is minimized and the temperature elevations of the catalyst portion and the downstream catalyst are made quick, whereby the HC desorbed from the adsorbent portion is purified at least by the downstream catalyst which is already in an ignition state.

It is desirable that the downstream catalyst is specifically at 150° C. or above, preferably at 250° C. or above when the HC desorption begins.

When there is oxygen shortage for the purification of the HC desorbed, it is conducted to feed secondary air or to adjust the ratio of the amounts of the air for combustion and the fuel fed.

The material for the honeycomb structure may be a metal. But, the material is preferably a ceramic, particularly a porous cordierite, because it has a low heat conductivity and gives a low heat conduction from the catalyst portion to the adsorbent portion, which prevents the quick temperature increase of the adsorbent portion and retards the timing of the desorption of adsorbed HC.

When there is used a system in which an adsorbent (which has such a structure as part of an exhaust gas to be purified can blow therethrough) and a catalyst are provided in an exhaust gas flow path with the catalyst placed at the downstream side of the adsorbent, part of the exhaust gas passes through the adsorbent and heats the downstream catalyst directly, making possible the early ignition of the catalyst.

In the present invention, the following adsorbent-catalyst, adsorbent and system are used preferably.

[Adsorbent-catalyst]

In the adsorbent-catalyst of the present invention, it is preferable that the honeycomb structure has a circular cross section (perpendicular to the flow direction of an exhaust gas to be purified) and is formed in a cylindrical shape extending parallel to said flow direction and that the catalyst layer is supported on the inner cylindrical portion of the cylindrical honeycomb structure, having the same axis as the honeycomb structure and the adsorbent layer is supported on the remaining portion of the honeycomb structure surrounding the inner cylindrical portion. It is also preferable for the early ignition of the catalyst provided at the downstream side of the adsorbent-catalyst that the cross-sectional area of the catalyst portion is 5–80% of the cross-sectional area of the honeycomb structure. This cross-sectional area (5–80%) of the catalyst portion is preferable also when the cross-sectional shapes of the honeycomb structure and the catalyst portion are not circular. When the cross-sectional area of the catalyst portion is smaller than 5% of the cross-sectional area of the honeycomb structure, the catalyst portion generates a small amount of a reaction heat when ignited early, and the temperature elevation of the downstream catalyst becomes insufficient. When the cross-sectional area of the catalyst portion exceeds 80%, the adsorbent portion has a low adsorbability.

In order to make large the temperature difference between the adsorbent portion and the catalyst portion, it is preferable to allow the adsorbent portion to have a larger heat capacity than the catalyst portion by various methods, for example, (1) making larger the wall thickness of the honeycomb structure at the adsorbent portion, (2) making higher the cell density of the honeycomb structure at the adsorbent portion, (3) making smaller the porosity of the honeycomb structure at the adsorbent portion, (4) using a material (e.g. a metal)

of larger heat capacity for the adsorption portion of the honeycomb structure, and (5) supporting a larger amount of an adsorbent layer on the adsorbent portion. The reverse is true for the catalyst portion and various methods are employed in order to allow the catalyst portion to have a smaller heat capacity than the adsorption portion. Particularly preferable are methods such as (1) making smaller the wall thickness of the honeycomb structure at the catalyst portion, (2) making lower the cell density of the honeycomb structure at the catalyst portion, and (3) supporting a smaller amount of a catalyst layer on the catalyst portion, because these methods can allow the catalyst portion to have a larger open frontal area and consequently can endow the catalyst portion with a smaller heat capacity and a lower pressure loss.

Figure 3:
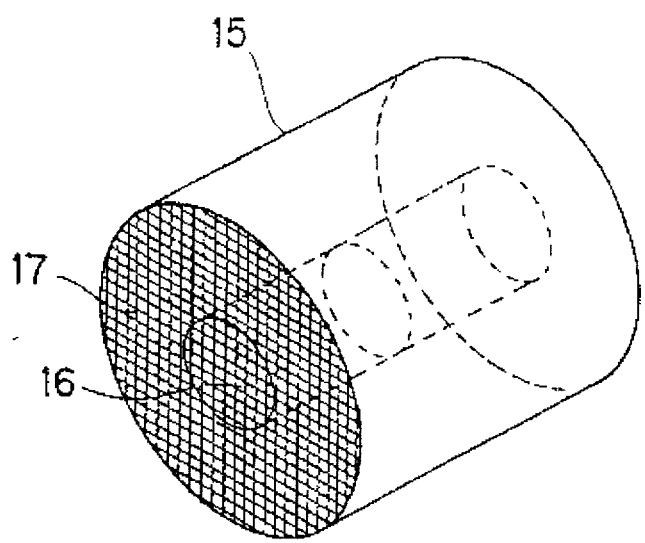
Figure 3:
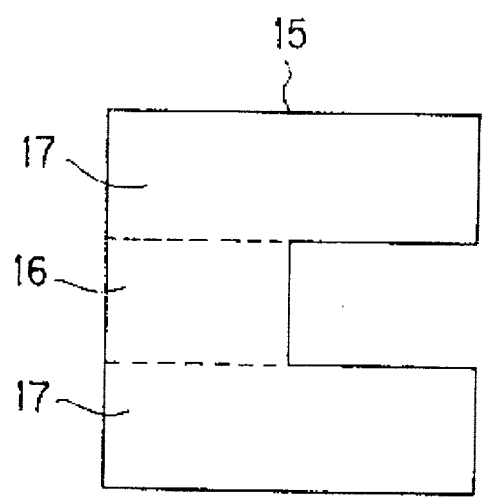

It is also preferable to make the length of at least part of the catalyst portion in the flow direction of an exhaust gas to be purified, smaller than the length of the adsorption portion in the same direction. Thereby, the heat capacity of the catalyst portion is made smaller; the pressure loss of the catalyst portion is made lower; a larger amount of an exhaust gas passes through the catalyst portion during the engine acceleration, and the catalyst portion is ignited at an early timing. Such a structure having a catalyst portion of smaller length can be obtained by supporting a catalyst layer only on part of the honeycomb structure portion other than the adsorbent portion, extending in the flow direction of an exhaust gas. Such a structure also can be obtained particularly preferably by, as shown in FIG. 3(a) (a perspective view) and FIG. 3(b) (a cross-sectional view), removing and making part of a honeycomb structure 15 hollow to make the length of the catalyst portion 16 in the flow direction of an exhaust gas, smaller than the length of the adsorbent portion 17 in the same direction.

In the adsorbent-catalyst of the present invention, the catalyst portion and the adsorbent portion may be provided so that either one is not surrounded by the other, or either or both of the catalyst portion and the adsorbent portion may be provided in two or more places. It is also possible that the front end (gas inlet) or back end (gas outlet) of the adsorbent-catalyst or part of the cross sections of the adsorbent-catalyst perpendicular to the flow direction of an exhaust gas is wholly or partially an adsorbent portion or a catalyst portion and that the adsorbent portion or the catalyst portion is not continuous in the flow direction of an exhaust gas from the front end (gas inlet) to the back end (gas outlet) of the adsorbent-catalyst.

[Adsorbent]

The adsorbent of the present invention comprises:

a honeycomb structure having a large number of parallel passages divided by partition walls, and an adsorbent layer having a hydrocarbon adsorbability, supported on the honeycomb structure, wherein a blowing-through portion is formed in the honeycomb structure so as to allow for the blowing of an exhaust gas through the portion. The blowing-through portion may be a non-supported portion of the honeycomb structure, extending from the gas inlet to the gas outlet in parallel to the exhaust gas flow direction, but is preferably a hollow portion formed in the honeycomb structure, extending in parallel to the exhaust gas flow direction. The hollow portion or the non-supported portion may be present at two or more places. The cross-sectional area of the hollow portion or the non-supported portion is preferably smaller than 50% of the cross-sectional area of the honeycomb structure. The blowing-through portion may be formed in parallel to the passages of the honeycomb structure, or may be formed with a certain inclination to the passages so that part of the exhaust gas passes through the blowing-through portion and the remainder of the exhaust gas flows into the adsorbent portion for the adsorption and desorption of HC.

[System]

There are provided, in an exhaust gas flow, the adsorbent-catalyst of the present invention and a catalyst, with the catalyst placed at the downstream side of the adsorbent-catalyst to purify the HC desorbed from the adsorbent portion of the adsorbent-catalyst. Preferably, a catalyst is further provided at the upstream side of the adsorbent-catalyst for the early ignition. Particularly preferably, system design is made so that the reaction heat generated in the upstream catalyst can quickly be conducted to the catalyst portion of the adsorbent-catalyst. These catalysts each comprise a honeycomb structure and a catalyst layer supported thereon. Preferably, an electrical heater or an EHC is provided between the adsorbent-catalyst and the upstream and/or downstream catalyst and/or at the further upstream side of the upstream catalyst, because it allows for the controlled desorption of HC from the adsorbent portion of the adsorbent-catalyst as well as for the early ignition of the catalyst portion of the adsorbent-catalyst and/or the catalyst(s). System design may also be made so that an exhaust pipe of particular shape or structure, a baffle, a guide for exhaust gas flow, or the like is provided to unevenly pass an exhaust gas through the adsorbent-catalyst during the engine acceleration to pass a larger amount of the exhaust gas through the catalyst portion than through the adsorbent portion and achieve the early ignition of the catalyst portion.

It is also preferable to design a system in which the adsorbent and the adsorbent-catalyst of the present invention are provided in series in an exhaust gas flow so as to function as a single adsorbent-catalyst. In this case, at the downstream side of the combination of the adsorbent and the adsorbent-catalyst must be placed a catalyst for the purification of the HC desorbed from the adsorbent, and preferably a catalyst is also provided at the upstream side of the adsorbent.

A system using the adsorbent of the present invention in place of the adsorbent-catalyst of the present invention is basically the same as the system using the adsorbent-catalyst. In the system, a catalyst is provided at the downstream side of the adsorbent for the purification of the HC desorbed from the adsorbent. Similarly to the case of the system using the adsorbent-catalyst, the system using the adsorbent can preferably use an electrical heater, or can preferably employ an exhaust pipe of particular shape or structure, a baffle, a guide for exhaust gas flow, or the like to give rise to the uneven flow of an exhaust gas and pass part of the exhaust gas through the blowing-through portion of the adsorbent.

In any system, more than one adsorbent-catalyst or adsorbent may be provided.

For obtaining an improved purification performance in the whole of the FTP test, it is preferable to provide a catalyst having a certain capacity relative to the engine displacement, at the downstream or upstream side of the above-mentioned system using the adsorbent-catalyst or the adsorbent.

The site at which the system comprising the adsorbent-catalyst and/or the adsorbent is provided, is preferably in the vicinity of an engine for the early ignition of the catalyst layer of the adsorbent-catalyst or the catalyst. The distance between the adsorbent-catalyst and/or the adsorbent and the catalyst(s) provided at the upstream and/or downstream side thereof is preferably small (adjacent to each other) so that the reaction heat generated in the catalyst layer of the upstream side is quickly conducted to the catalyst layer of the downstream side to accelerate the ignition of the catalyst layer of the downstream side.

In order to favorably decrease the HC generated during the cold start, it is necessary that at least the catalyst or the catalyst portion of the adsorbent-catalyst ignites early. Usually, in a fuel-rich region formed during the cold start, the combustion reaction by the catalyst or the catalyst portion of the adsorbent-catalyst scarcely occurs, nor is expected the sufficient heating of said catalyst or said catalyst portion by the heat of the reaction. Therefore, it is necessary to install an oxidizing gas-feeding means (e.g. a secondary air-feeding means) for feeding an oxidizing gas (e.g. secondary air) to the upstream side of the catalyst (nearest to the engine) or the adsorbent-catalyst, or a fuel-combustion air adjustment means (an A/F adjustment means) for adjusting the amount of fuel and the amount of combustion air, thereby making the exhaust gas composition oxygen-excessive during the cold start.

Herein, the oxygen-excessive exhaust gas composition refers to a composition which is oxygen-excessive as compared with the exhaust gas composition formed during the cold start of an usual internal combustion engine having no specific control means. Specifically, in the case of a gasoline car, the air-fuel ratio is shifted to 14.0 (a weak-reduction side) or more, preferably a lean side of 14.6–19.0 (an equivalent point to an oxidation side). When the air-fuel ratio is shifted to the lean side in this way, the oxidizing activity of the catalyst (or the catalyst portion of the adsorbent-catalyst) can be remarkably improved. In the case that a reformed gasoline, methanol or the like is used as the fuel, the theoretical air-fuel ratio differs and, therefore, in such a case, the above-mentioned air-fuel ratio is converted by the use of an equivalent ratio $\lambda$, and the air-fuel ratio of the reformed gasoline, methanol or the like is shifted preferably to the lean side of the thus converted value.

When the HC adsorbed by the adsorbent portion (of the adsorbent-catalyst) or the adsorbent begins to be desorbed from the adsorbent portion or the adsorbent, the exhaust gas composition temporarily shifts to a reduction side. Therefore, even if the catalyst portion (of the adsorbent-catalyst) or the downstream catalyst has reached its ignition temperature, the combustion reaction of the desorbed HC is insufficient in some cases. It is necessary therefore that at least one oxidizing gas-feeding means and/or fuel-combustion air adjustment means is installed in front (on the upstream side) of the adsorbent-catalyst or the downstream catalyst to make the exhaust gas composition oxygen-excessive and effectively burn the desorbed HC with the aid of the catalyst portion or the catalyst.

That is to say, for the two purposes of early igniting the catalyst portion or the catalyst and favorably removing the HC desorbed from the adsorbent portion or the adsorbent, with the aid of the catalyst portion or the downstream catalyst, the oxidizing gas-feeding means and/or the fuel-combustion air adjustment means is required.

A detecting means capable of detecting that the HC adsorbed by the adsorbent portion or the adsorbent has begun to be desorbed therefrom, for example, an $O_2$ sensor or an HC sensor is preferably installed at least between the adsorbent portion or the adsorbent and the downstream catalyst, whereby the desorption of the HC can be detected by this detecting means and, in accordance with a signal therefrom, the oxidizing gas-feeding means or the fuel-combustion air adjustment means is operated.

In order to early ignite the catalyst portion or the catalyst, the oxidizing gas-feeding means or the fuel-combustion air adjustment means is usually operated in accordance with a signal form the $O_2$ sensor for A/F adjustment arranged at a foremost position of the adsorbent-catalyst or the catalyst, or in accordance with a beforehand prepared external program for avoiding the rich region which is formed during the cold start. In this case, both of the oxidizing gas-feeding means and the fuel-combustion air adjustment means may be installed.

In order to favorably burn the HC desorbed from the adsorbent portion or the adsorbent with the aid of the downstream catalyst, the oxidizing gas-feeding means is installed at least at any desired position in front (on the upstream side) of the downstream catalyst. This means may also serve as the oxidizing gas-feeding means which is provided in front of the catalyst or the adsorbent-catalyst nearest to the engine for the early ignition of said catalyst or said adsorbent-catalyst, or the former means may be installed separately from the latter means. In the case that a plurality of the oxidizing gas-feeding means are installed, they may be operated separately or in linkage.

For the purpose of favorably removing harmful components such as HC, CO, $NO_x$ and the like discharged from the internal combustion engine, the catalyst portion (of the adsorbent-catalyst) and the catalyst preferably comprise a honeycomb structure of a heat-resistant inorganic material coated with a catalyst layer of a heat-resistant oxide containing at least one noble metal selected from Pt, Pd and Rh. The material of the honeycomb structure is preferably cordierite or ferrite-based stainless steel in view of the heat-resistance and thermal shock resistance.

Each of these noble metals is used by being supported on a heat-resistant oxide such as $Al_2O_3$, $SiO_2$, $TiO_2$ or $ZrO_2$, or its compound oxide. It is particularly preferable to use, as the heat-resistant oxide, an $Al_2O_3$ having a specific surface area of 100 m$^2$/g or more, because the oxide can support the noble metal in a highly dispersed state and the resulting catalyst layer of the honeycomb structure can have improved low-temperature ignition property and heat resistance.

It is particularly preferable to add 5–30% by weight of an oxide having an oxygen storability, such as $CeO_2$, $La_2O_3$ or $CeO_2$—$ZrO_2$ to the above-mentioned heat-resistant oxide, because the catalyst layer of the honeycomb structure can have an improved steady state activity.

The total amount of the supported noble metal(s) in the catalyst portion or the catalyst is preferably in the range of 20 to 130 g/ft$^3$, and the amount of the supported Rh is preferably in the range of 2 to 30 g/ft$^3$. The supporting of Pd alone in an amount of 40–300 g/ft$^3$ is also preferable because it allows for low-temperature ignition.

The adsorbent portion or the adsorbent is preferably a honeycomb structure of the above-mentioned heat-resistant inorganic material, coated with an adsorbent layer comprising zeolite as the main component.

Materials capable of adsorbing harmful components such as HC and the like include zeolite, active carbon, etc. The use of zeolite in the adsorbent layer is preferable because the adsorbent disposed in an exhaust gas flow path without using a by-pass system must have a heat resistance of at least 500° C.

The zeolite used in the present invention may be a natural or synthetic product, and no particular restriction is put on the kind of the zeolite. However, a zeolite having an Si/Al molar ratio of 40 or more can be suitably used from the viewpoints of heat resistance, durability and hydrophobicity. Typical examples of the preferable zeolite are ZSM-5, USY, β-zeolite, silicalite and metallosilicate.

These zeolites may be used singly or in combination. For example, the zeolite ZSM-5 having relatively small micropores of about 0.55 nm is advantageous to adsorb propene, etc. having a small molecule but disadvantageous to adsorb toluene, xylene, etc. having a large molecule. On the contrary, the zeolite USY having relatively large micropores of about 0.74 nm is disadvantageous to adsorb propene, etc. having a small molecule but advantageous to adsorb toluene, xylene, etc. having a large molecule. Therefore, it is one preferable manner to coat a honeycomb structure with a mixture of ZSM-5 and USY. Alternatively, ZSM-5 and USY may be supported on the honeycomb structure separately in the flow direction of an exhaust gas to be purified. In this case, it is preferable to support ZSM-5 on the upstream side of the honeycomb structure, because ZSM-5 can adsorb and hold HC up to a relatively high temperature of 150° C.

Zeolite can be used per se as the adsorbent but, in order to control coking which occurs simultaneously with the adsorption of HC, etc., it is preferred that at least one noble metal selected from Pt, Pd and Rh is supported on zeolite, whereby the adsorption performance of zeolite can be regenerated without any deterioration.

As the noble metal which can be supported on zeolite, Pd is preferable, because it is most inexpensive and has a high ability for regeneration of zeolite. In order to support the noble metal on zeolite, an ion exchange method is preferable from the viewpoint of thermal stability. The amount of the noble metal to be supported is preferably in the range of 5 to 40 g/ft$^3$ (honeycomb volume) from the view-points of cost and ability for zeolite regeneration. In supporting zeolite on the honeycomb structure, zeolite may contain, as necessary, 5 to 20% by weight of an inorganic binder such as $Al_2O_3$ or $SiO_2$, whereby zeolite can be strongly supported without impairing the adsorbability for HC, etc.

When a noble metal is supported on zeolite, the noble metal has not only the ability for zeolite regeneration but also a catalytic activity. However, the noble metal in zeolite is liable to sinter and is poor in catalyst durability. Therefore, an adsorbent layer may contain zeolite and the same catalyst component as contained in the catalyst layer of the catalyst, or may be a zeolite-containing adsorbent layer having thereon a catalyst layer containing a catalyst component. Resultantly, the adsorption portion or the adsorbent contains a durable catalyst component and therefore can favorably exhibit the purification performance even during the steady drive after the cold start. The addition of the catalyst component is effective also for the suppression of zeolite coking and therefore it is not always necessary to add the noble metal to zeolite.

It is also preferable to allow zeolite to contain at least one ion selected from the ions of IB group elements (Cu, Ag and Au) of periodic table, because the resulting zeolite can have an improved HC adsorbability. The content of the ion in zeolite is preferably 20% or more, preferably 40% or more based on the Al atom in zeolite because a low content of the ion gives only small improvement in HC adsorbability. The ion may be contained in zeolite, in any desired combination with the above-mentioned noble metal.

Desirably, zeolite further contains, in addition to at least one ion of IB group elements, at least one ion selected from the ions of Mg, Ca, Sr, Ba, Y, La, Ti, Ce, Mn, Fe, Cr, Ni and Zn, preferably at least one ion selected from the ions of Mg, Ca, Fe and Cr, because the resulting zeolite has an improved heat resistance.

As one preferable example of the adsorbent-catalyst or adsorbent in which the surface of the adsorbent layer is coated with a catalyst layer, there is a multilayer type catalyst-adsorbent or adsorbent in which the surface of the honeycomb structure is coated with a first layer, i.e. a high-silica zeolite such as ZSM-5, USY or β-zeolite having a noble metal supported thereon and further the surface of the first layer is coated with a second layer, i.e. an $Al_2O_3$-$CeO_2$ compound oxide having a noble metal supported thereon.

In such a multilayer type catalyst-adsorbent or adsorbent, $Al_2O_3$ (which is the main component of the second layer) acts as a predryer for the selective adsorption of the $H_2O$ contained in the exhaust gas generated during the cold start and enhances the adsorbability of the first layer for HC. In addition, with the rise in the exhaust gas temperature, the second layer (the surface layer) containing the catalyst component is first heated and, at a time when the zeolite component in the first layer desorbs the adsorbed HC, etc., the catalyst component in the second layer functions favorably. It is essential that at the time of the desorption of HC, etc., the exhaust gas is made oxygen-excessive by the addition of an oxidizing gas or by the adjustment of the ratio of the amount of combustion air and that of the fuel fed. By thus making the exhaust gas oxygen-excessive, the catalytic activity of the second layer can be remarkably improved.

Even when no multilayer type is used and the catalyst component having a noble metal supported thereon and the zeolite component are supported on the honeycomb structure in a mixed state, the resulting adsorbent-catalyst or adsorbent can function relatively well.

The weight ratio of the zeolite component to the catalyst component is 50–85:15–50, and it is preferable that a larger amount of the zeolite component is contained. With respect to the amounts to be supported on the honeycomb structure, the amount of the zeolite component is preferably in the range of 0.05 to 0.40 g/cc and that of the catalyst component is preferably in the range of 0.02 to 0.20 g/cc.

In the present invention, it is preferred that at least one electrical heater (hereinafter referred to as "EH") is installed in the exhaust system for the purpose of achieving the early ignition of the catalyst portion (of the adsorbent-catalyst) or the catalyst.

The EH is preferably constituted by attaching electrodes for electrification to a honeycomb structure comprising a heat-resistant metal such as ferrite or the like, from the viewpoints of pressure loss and heat resistance. Preferably, this EH is coated with a catalyst layer comprising a heat-resistant inorganic oxide containing at least a noble metal to form an EHC (i.e. an electrically-heated catalyst), because, with this EHC, the heat of catalytic reaction of HC, etc. can reduce the electric power required to heat the heater.

In the exhaust gas purification method of the present invention, the activation of the catalyst portion (of the adsorbent-catalyst) or the catalyst in the purification system can be accomplished by feeding an oxidizing gas into the system. As the oxidizing gas, there can be used ozone, $O_2$—, secondary air, etc. and, among these, secondary air is most preferable, because it can be fed by a simple device such as an air pump or the like.

The feed of the oxidizing gas may be initiated substantially simultaneously with the start of an engine when the adsorbent-catalyst or the catalyst is arranged in the vicinity of the engine, because the adsorbent-catalyst or the catalyst is rapidly heated by the heat of the exhaust gas generated from the engine. The feed of the oxidizing gas is usually stopped at a time when an $O_2$ sensor for A/F adjustment functions with the warming up of the engine and the operation is performed in an equivalent ratio. In the case of using an $O_2$ sensor having a heater, the feed of the oxidizing gas is stopped at a time when 20 to 50 seconds have elapsed after engine cranking and, in the case of using an $O_2$ sensor having no heater, it is done at a time when about 40 to 140 seconds have elapsed after the engine cranking.

On the other hand, the feed timing of the oxidizing gas which is fed so as to effectively burn the HC desorbed from the adsorbent portion or the adsorbent, with the catalyst portion or the downstream catalyst, is detected preferably by the use of a detecting means (e.g. an $O_2$ sensor or an HC sensor) provided at the downstream side of the adsorbent-catalyst or the adsorbent. The amount of the oxidizing gas to be fed is such that the exhaust gas composition is in an oxygen-excessive state at the adsorbent-catalyst or the downstream catalyst, and this amount can be controlled, for example, by using the output from the detecting means. In general, when the temperature of the adsorbent portion or the adsorbent exceeds 80°–100° C., HC begins to be desorbed. Therefore, the feed of the oxidizing gas is started within 50 seconds from the engine cranking although it differs by the position of the adsorbent-catalyst or the adsorbent, and is stopped at a time when about 40 to 140 seconds have elapsed from the engine cranking.

Use of an EH or EHC is preferable because, by applying a voltage to the EH or EHC simultaneously with the feeding of an oxidizing gas, the HC desorbed from the adsorbent portion can be efficiently purified at the catalyst portion or the downstream catalyst.

The amount of the oxidizing gas to be fed is in the range of about 50 to 300 l/min, although it differs by the displacement of an engine. If the oxidizing gas is excessively fed, the catalyst portion or the downstream catalyst is cooled. Hence, it is most preferable that the oxidizing gas is fed in such an amount that the air-fuel ratio is in the vicinity of an equivalent point. The amount of the oxidizing gas to be fed may be constant or appropriately changed.

The oxygen-excessive exhaust gas composition can be obtained not only by the feed of an oxidizing gas but also by operating the engine in a particular mode, i.e., by adjusting the amount of combustion air and that of the fuel fed, and a similar effect can be obtained also by the latter method. Examples of the latter method include a method which comprises feeding a fuel in an amount smaller than a theoretical amount with respect to the air amount detected by an air flow sensor or the like, in an open-loop control (using no $O_2$ sensor) after the engine ignition; a method which comprises controlling the air-fuel ratio by the use of an $O_2$ sensor and a computer so that this ratio is, for example, at a lean side for a certain period of time; and a method which comprises controlling the air-fuel ratio by the use of, for example, a PEGO sensor (Proportional Exhaust Gas Oxygen Sensor) (whose output linearly changes in accordance with the air-fuel ratio) so that this ratio is, for example, at a lean side for a certain period of time.

At the time of engine ignition, a fuel-rich state is taken for engine operativity. Therefore, there is required, in addition to an usual system, a device capable of controlling the exhaust gas composition by the above-mentioned method. The method for controlling the exhaust gas composition by the use of a sensor is excellent in accuracy, but much time is taken to warm up the sensor itself. This inconvenience can be fairly reduced by the use of, for example, a sensor having a heater. However, in order to obtain an oxygen-excessive exhaust gas composition relatively promptly, it is preferable to feed an oxidizing gas or to use a device other than the sensor. The simultaneous utilization of (1) the feed of an oxidizing gas and (2) the adjustment of the combustion air amount and the fuel amount is also preferable to obtain an oxygen-excessive exhaust gas composition.

The present invention is hereinafter described in more detail by way of Examples. However, the present invention is not restricted to these Examples.

[Production of adsorbent-catalysts]

Adsorbent-catalyst I 0.23 g/cc of $\gamma$-$Al_2O_3$.$CeO_2$ (weight ratio=70:30) was supported on a central cylindrical portion of a cylindrical cordierite-based honeycomb structure (a product of NGK Insulators, Ltd.) (diameter of cross section=144 mm, length=100 mm, wall thickness=150 µm, cell density=400 cells/in$^2$), i.e. a cylindrical portion having the same central axis as the honeycomb structure in the passage direction of the honeycomb structure and having a diameter of cross section of 88 mm and the same length (100 mm) as the honeycomb structure. Thereon was further supported Pd, Pt and Rh at a ratio of 6:5:1 in a total amount of 80 g/ft$^3$. Firing was conducted at 550° C. to form a catalyst layer. On the portion of the honeycomb structure surrounding the honeycomb portion on which the catalyst layer was supported, was supported 0.15 g/cc of a ZSM-5 (a product of The PQ Corporation) having a Si/Al molar ratio of 280. Firing was conducted at 550° C. to form an adsorbent layer. Thus was obtained an adsorbent-catalyst I as shown in FIG. 1, consisting of (1) a central cylindrical catalyst portion 16 formed by supporting a catalyst layer on a central cylindrical portion of a cylindrical honeycomb structure 15 and (2) an outer adsorbent portion 17 formed by supporting an adsorbent layer on the remaining portion of the honeycomb structure.

Adsorbent-catalyst II

Figure 2:
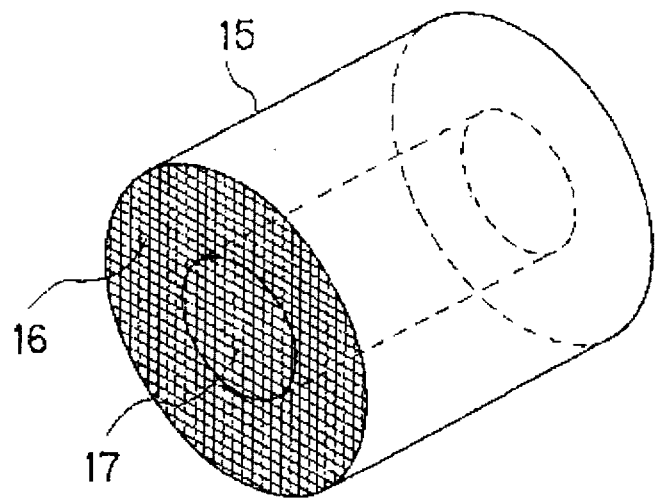

In the same manner as in the adsorbent-catalyst I, the same ZSM-5 as used in the above adsorbent-catalyst I was supported on a central cylindrical portion of the same cylindrical honeycomb structure as used in the adsorbent-catalyst I, i.e. a cylindrical portion having the same central axis as the honeycomb structure in the passage direction of the honeycomb structure and having a diameter of cross section of 104 mm and the same length (100 mm) as the honeycomb structure. Then, firing was conducted in the same manner as in the adsorbent-catalyst I, to form an adsorbent layer. In the same manner as in the adsorbent-catalyst I, a catalyst was supported on the portion of the honeycomb structure surrounding the honeycomb portion on which the ZSM-5 was supported, and then firing was conducted to form a catalyst layer. Thus was obtained an adsorbent-catalyst as shown in FIG. 2, consisting of (1) a central cylindrical adsorbent portion 17 formed by supporting an adsorbent layer on a central cylindrical portion of a cylindrical honeycomb structure 15 and (2) an outer catalyst portion 16 formed by supporting a catalyst layer on the remaining portion of the honeycomb structure.

Adsorbent-catalyst III

From the same cylindrical honeycomb structure as used in the adsorbent-catalyst I was removed a cylindrical portion of 88 mm (diameter of cross section) and 50 mm (length) having the same central axis as the honeycomb structure in the passage direction of the honeycomb structure and including one end of the honeycomb structure, and the resulting honeycomb structure having a cylindrical hollow was used as a carrier for production of adsorbent-catalyst. Separately, $\gamma$-$Al_2O_3$.$CeO_2$ (weight ratio=70:30) was impregnated with Pd by the use of an aqueous $Pd(NO_3)_3$ solution, followed by drying and 550° C. firing, to obtain a Pd-supported $\gamma$-Al $_2O_3 \cdot CeO_2$ compound oxide. 0.1 g/cc of this compound oxide was supported on a central cylindrical portion of the above-obtained honeycomb structure extending from the hollow to other end of the honeycomb structure and having a diameter of cross section of 88 mm and a length of 50 mm in the passage direction of the honeycomb structure. Firing was conducted at 550° C. to form a catalyst layer. The amount of Pd supported in the catalyst layer was 150 g/ft$^3$. Separately, the same ZSM-5 as used in the adsorbent-catalyst I was treated with $(NH_3)_2Pt(NO_2)_2$ at 90° C. for 4 hours for ion-exchange with Pt, followed by drying and 550° firing, to obtain a Pt-ion-exchanged zeolite powder. This powder was supported on the portion of the above-obtained honeycomb structure surrounding its catalyst layer-supported portion. Firing was conducted at 550° C. to form a first layer. The amount of the first layer supported was 0.15 g/cc and the amount of Pt in the first layer was 33.3 g/ft$^3$. Then, in the same manner, a Rh-predoped $\gamma$-$Al_2O_3$ powder was supported on the first layer, followed by firing, to form a second layer. The amount of the second layer supported was 0.05 g/cc and the amount of Rh in the second layer was 6.7 g/ft$^3$. A Pd-predoped $\gamma$-$Al_2O_3$ powder was supported on the second layer, followed by firing, to form a third layer. The amount of the third layer supported was 0.03 g/cc and the amount of Pd in the third layer was 40 g/ft$^3$. Thus was obtained an adsorbent-catalyst III as shown in FIG. 3(a) (a perspective view) and FIG. 3(b) (a cross-sectional view), consisting of (1) a central cylindrical catalyst portion 16 formed by supporting a catalyst layer on the central cylindrical portion of a cylindrical honeycomb structure 15 (having a cylindrical hollow), having a shorter length than the remaining honeycomb structure portion in the axial (passage) direction of the honeycomb structure and (2) an adsorbent portion 17 surrounding the catalyst portion 16, formed by supporting an adsorbent layer comprising a plurality of layers each containing a catalyst component, on the remaining honeycomb structure portion surrounding its central cylindrical portion.

Adsorbent-catalyst IV

Figure 4:
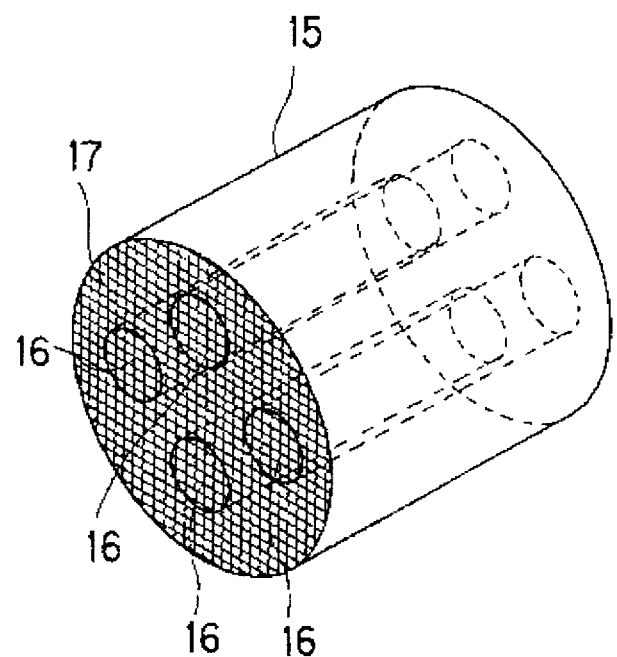

In the same manner as in the case of the adsorbent-catalyst I, a catalyst layer was supported on four parallel inner cylindrical portions (of same size) of the same honeycomb structure as used in the adsorbent-catalyst I. Each of the four parallel cylindrical portions had a diameter of cross section of 50 mm and the same length (100 mm) as the honeycomb structure in the passage direction of the honeycomb structure and had an axis extending parallel to the axis of the honeycomb structure and passing one of the four points quartering a circle (80 mm in diameter) which was on the cross section of the honeycomb structure (perpendicular to the passage direction) and which had the same center as the cross section. Then, firing was conducted in the same manner as in the case of the adsorbent-catalyst I. On the remaining portion of the honeycomb structure was supported the same ZSM-5 as used in the adsorbent-catalyst I, following by firing, in the same manner as in the case of the adsorbent-catalyst I. Thus was obtained an adsorbent-catalyst IV as shown in FIG. 4, consisting of (1) four catalyst portions 16 formed by supporting a catalyst layer on four parallel inner cylindrical portions of a cylindrical honeycomb structure 15 and (2) an adsorbent portion 17 formed by supporting an adsorbent layer on the remaining honeycomb structure portion.

Adsorbent-catalyst V

Figure 5:
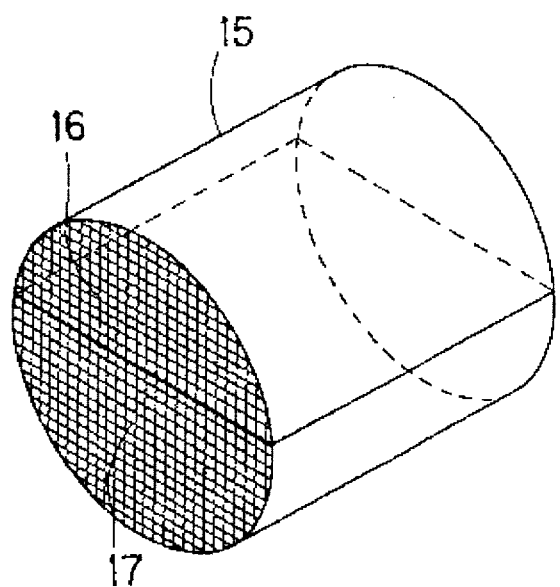

A catalyst layer was supported on a portion of small cross-sectional area of the same cylindrical honeycomb structure as used in the adsorbent-catalyst 1, and then firing was conducted, in the same manner as in the case of the adsorbent-catalyst I. On the remaining portion of large cross-sectional area of the honeycomb structure was supported the same ZSM-5 as used in the adsorbent-catalyst I, and then firing was conducted, in the same manner as in the case of the adsorbent-catalyst I. The portion of small cross-sectional area of the honeycomb structure was a portion of small cross-sectional area of the honeycomb structure present when the honeycomb structure was divided into two portions by a plane which orthogonally intersected a diameter of the cross section of the honeycomb structure at its 64 mm:80 mm point and which was parallel to the axis of the honeycomb structure extending in its passage direction; and the portion of large cross-sectional area was the remaining portion of large cross-sectional area of the honeycomb structure. Thus was obtained an adsorbent-catalyst V as shown in FIG. 5, consisting of (1) a catalyst portion 16 formed by supporting a catalyst layer on a small portion of a cylindrical honeycomb structure 15 present when the honeycomb structure was divided into two portions of different size and (2) an adsorbent portion 17 formed by supporting an adsorbent layer on the remaining large honeycomb structure portion.

Adsorbent-catalyst VI

Figure 6:
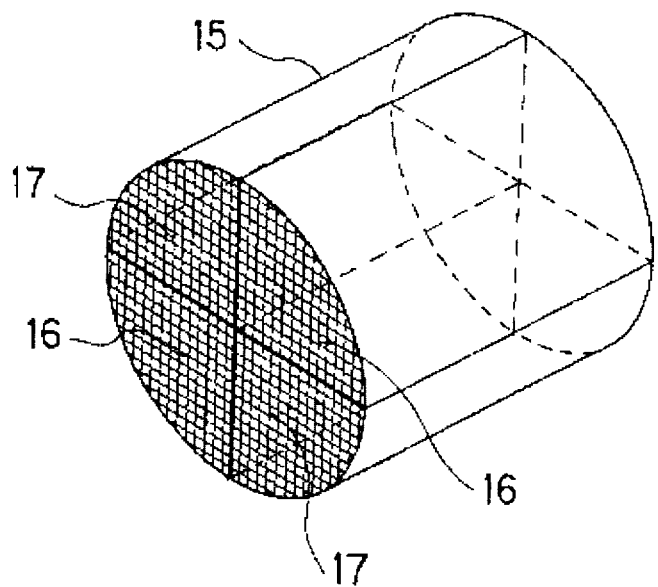

In the same manner as in the case of the adsorbent-catalyst I, a catalyst layer was supported on two of the four equally divided portions of the same cylindrical honeycomb structure as used in the adsorbent-catalyst I. The four equally divided portions of the honeycomb structure were four equal portions of the honeycomb structure present when the honeycomb structure was quartered by two orthogonal planes including the central axis of the honeycomb structure parallel to the passage of the honeycomb structure, and the two portions were opposing to each other and were in contact with each other only at the central axis of the honeycomb structure. Then, firing was conducted in the same manner as in the case of the adsorbent-catalyst I. On the remaining two portions of the honeycomb structure was supported the same ZSM-5 as used in the adsorbent-catalyst I, followed by firing, in the same manner as in the case of the adsorbent-catalyst I. Thus was obtained an adsorbent-catalyst VI as shown in FIG. 6, consisting of (1) a catalyst portion 16 formed by supporting a catalyst layer on two of the four equally divided portions of a cylindrical honeycomb structure 15 (said four portions and said two portions were explained above) and (2) an adsorbent portion 17 formed by supporting an adsorbent layer on the remaining two portions of the honeycomb structure.

Adsorbent-catalyst VII

Figure 7:
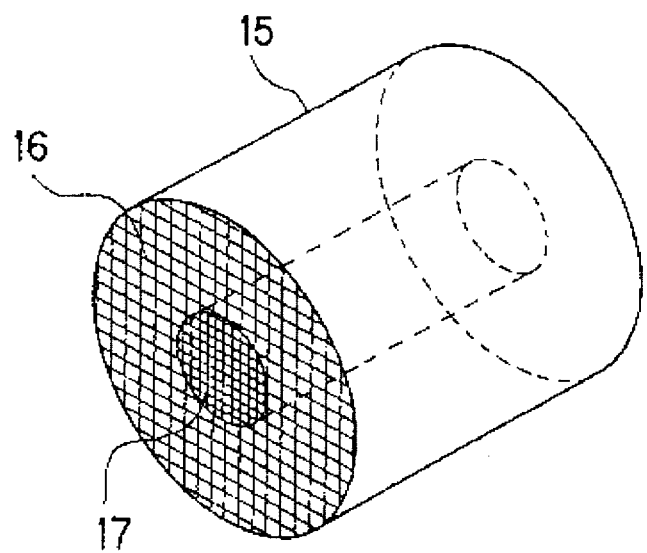

A carrier for adsorbent-catalyst was produced by bonding, with a ceramic bonding material of low expansion, two cylindrical honeycomb structures, i.e. (1) a hollow cylindrical cordierite-based honeycomb structure (outside diameter=144 mm, inside diameter=45 mm, l=100 mm, wall thickness=300 μm, cell density=300 cells/in$^2$) and (2) a cylindrical cordierite-based honeycomb structure (diameter=44 mm, l=100 mm, wall thickness=100 μm, cell density= 400 cells/in$^2$). In the same manner as in the case of the adsorbent-catalyst I, a catalyst layer was supported on the honeycomb structure of 300 cells/in$^2$ constituting the outer portion of the above carrier, and firing was conducted. In the same manner as in the case of the adsorbent-catalyst I, the same ZSM-5 as used in the adsorbent-catalyst I was supported on the honeycomb structure of 400 cells/in² constituting the inner portion of the carrier, and firing was conducted. Thus was obtained an adsorbent-catalyst VII as shown in FIG. 7, consisting of (1) an adsorbent portion 17 formed by supporting an adsorbent layer on the inner cylindrical portion of high cell density, of a cylindrical honeycomb structure 15 and (2) a catalyst portion 16 formed by supporting a catalyst layer on the outer portion of low density, of the honeycomb structure.

Production of adsorbents

Adsorbent I

Figure 8:
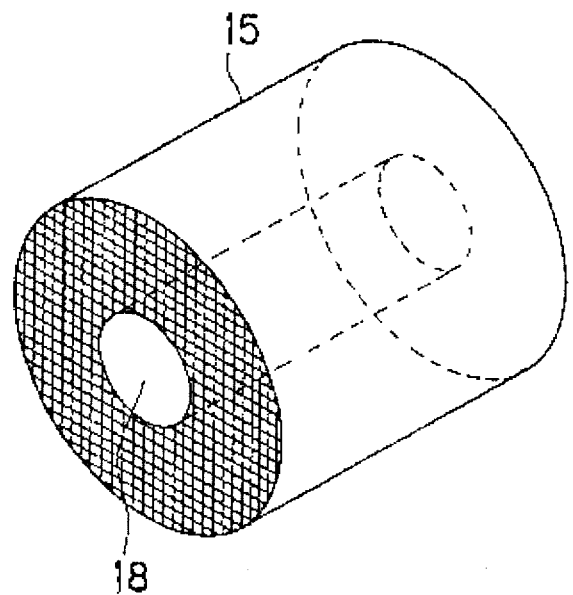
FIG. 8 to FIG. 10 are each a view showing an example of the adsorbent according to the present invention.

A hollow cylindrical carrier for adsorbent was produced by removing an inner cylindrical portion from a cylindrical cordierite-based honeycomb structure (a product of NGK Insulators, Ltd.) (diameter=144 mm, g=100 mm, wall thickness=150 μm, cell density=400 cells/in²). The removed inner cylindrical portion of the cylindrical honeycomb structure (i.e. the hollow portion of the obtained ceramic) had the same central axis as the honeycomb structure, parallel to the passages of the honeycomb structure and had a diameter of cross section of 88 mm and the same length (100 mm) as the honeycomb structure in the passage direction of the honeycomb structure. The same ZSM-5 as used in the adsorbent-catalyst I was supported on the carrier and then subjected to firing, in the same manner as in the case of the adsorbent-catalyst I. Thus was obtained an adsorbent I as shown in FIG. 8, comprising (1) a hollow cylindrical honeycomb structure 15 having a cylindrical blowing-through portion 18 parallel to the passage direction of the honeycomb structure, at the central portion and (2) an adsorbent layer supported thereon. That is, the adsorbent 1 is the same material as obtained by removing the catalyst portion from the adsorbent-catalyst I.

Adsorbent II

Figure 9:
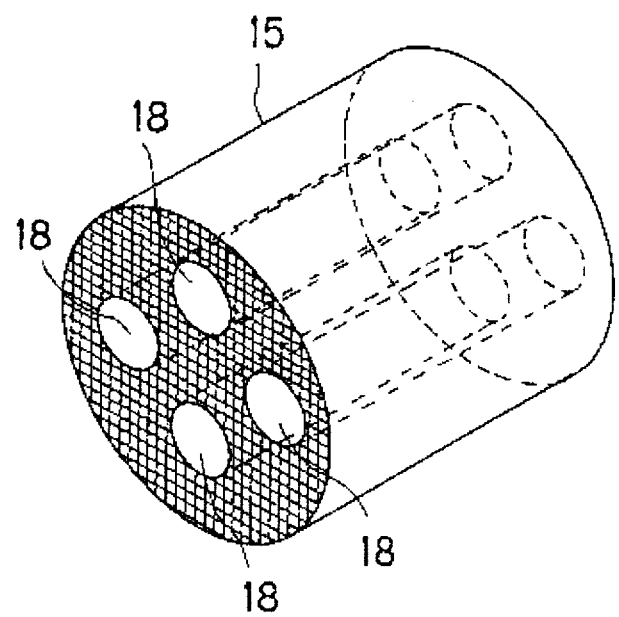

A cylindrical carrier for adsorbent, having four parallel cylindrical open holes of same size were produced by removing four parallel cylindrical portions of same size from the same cylindrical honeycomb structure as used in the adsorbent-catalyst I. Each of the four parallel cylindrical portions had a diameter of cross section of 50 mm and the same length (100 mm) as the honeycomb structure in the passage direction of the honeycomb structure and had an axis extending parallel to the axis of the honeycomb structure and passing one of the four points quartering a circle (80 mm in diameter) which was on the cross section of the honeycomb structure (perpendicular to the passage direction) and which had the same center as the cross section. On the carrier was supported the same ZSM-5 as used in the adsorbent-catalyst I, followed by firing, in the same manner as in the case of the adsorbent-catalyst I. Thus was obtained an adsorbent II as shown in FIG. 9, comprising (1) a cylindrical honeycomb structure 15 having four parallel cylindrical blowing-through portions 18 of same size and (2) an adsorbent layer supported thereon. That is, the adsorbent II is the same material as obtained by removing the catalyst portion from the adsorbent-catalyst IV to form four parallel cylindrical blowing-through portions therein.

Adsorbent III

Figure 10:
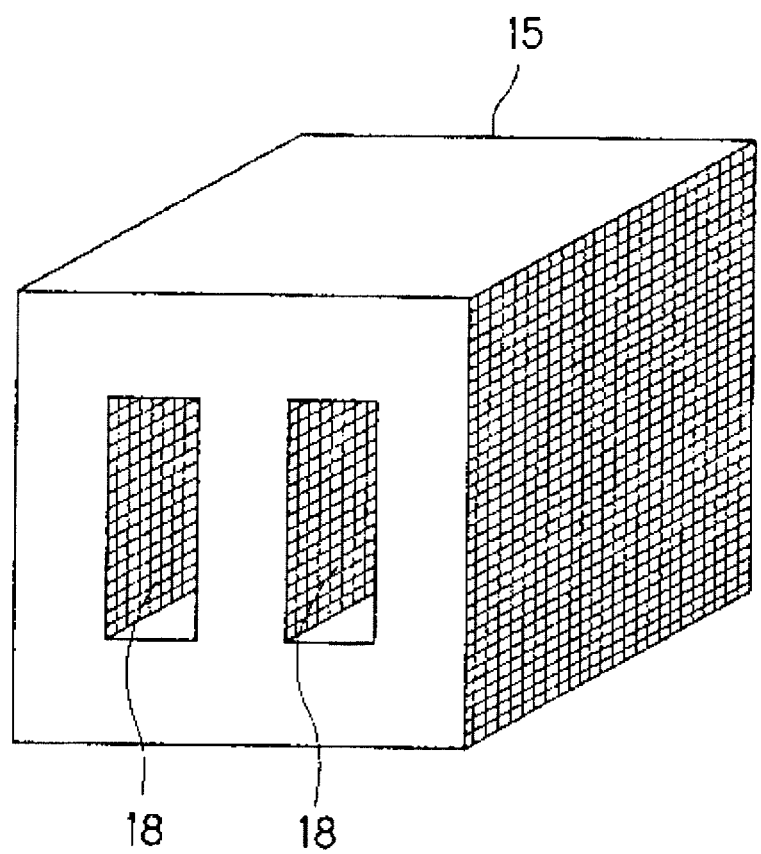

A cubic carrier for adsorbent, having two parallel open holes of same size was produced by removing, from a cubic cordierite-based honeycomb structure of 100 mm×100 mm×100 mm, two parallel portions each of 50 mm×20 mm×100 mm (length) whose length directions were each perpendicular to the axial direction of the passages of the honeycomb structure and which were apart from each other by 20 mm. On the carrier was supported the same ZSM-5 as used in the adsorbent-catalyst I, and firing was conducted in the same manner as in the case of the adsorbent-catalyst I. Thus was obtained an adsorbent III as shown in FIG. 10, comprising (1) a cubic honeycomb structure 15 having two parallel blowing-through portions 18 of same size perpendicular to the axial direction of the passages of the honeycomb structure and (2) an adsorbent layer supported thereon.

Production of catalysts

Catalysts I, II, III and IV 0.23 g/cc of γ-$Al_2O_3$.$CeO_2$ (weight ratio=70:30) was supported on each of four cylindrical cordierite-based honeycomb structures (products of NGK Insulators, Ltd.) wall thickness=150 μm; cell density=400 cells/in², diameter and length=93 mm and 33 mm (catalyst I), 99 mm and 99 mm (catalyst II), 144 mm and 100 mm (catalyst III) and 76 mm and 88 mm (catalyst IV). Then, Pd, Pt and Rh were supported at a 6:5:1 in a total amount of 80 g/ft³, followed by firing at 550° C., to obtain catalysts I, II, III and IV.

Production of electrical heater

An Fe powder, a Cr-30 Al powder (wt. %), an Fe-50 Al powder (wt. %), an Fe-20 B powder (wt. %) and a $Y_2O_3$ powder each having an average particle diameter of 44 μm or less were mixed so as to obtain a composition of Fe-18 Cr-8 Al- 0.05 B-0.5 $Y_2O_3$. Next, methyl cellulose as an organic binder and oleic acid as an antioxidant were added to the composition at proportions of 4 g and 1 g per 100 g of the composition, followed by mixing. Next, the resultant mixture (bullets) was extruded to form a cylindrical honeycomb article, and the honeycomb article was dried at 90° C. for 16 hours in the atmosphere, fired (sintered) at 1,325° C. for 2 hours in a hydrogen atmosphere, and then subjected to a heat treatment at 1,150° C. for 30 minutes in the air to obtain a honeycomb structure. The honeycomb structure had a porosity of 3%.

Figure 25:
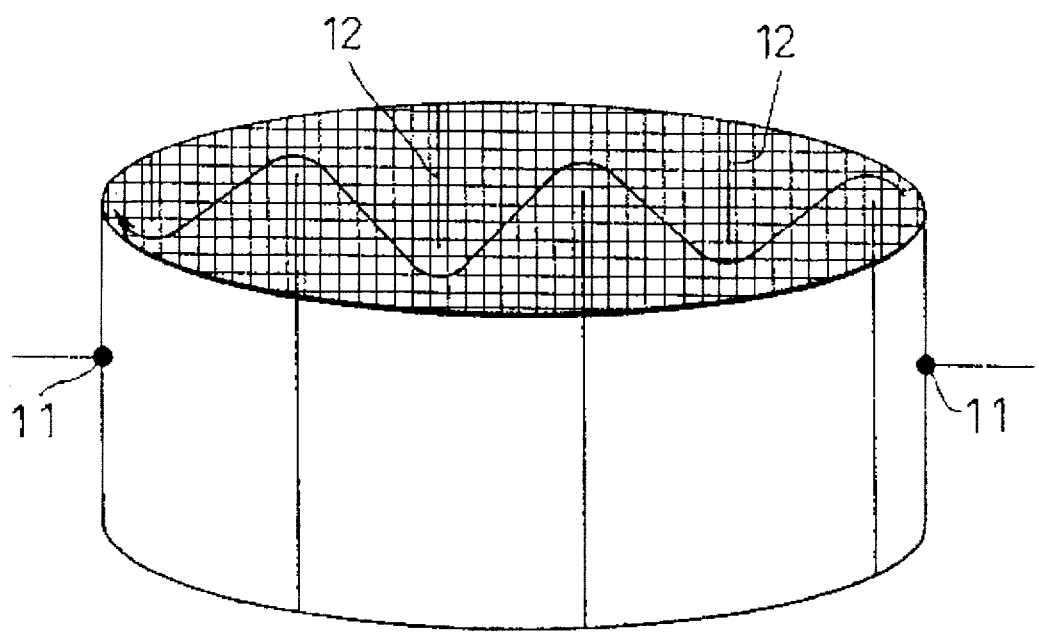
FIG. 25 is a view showing an example of the electrical heater used in the present invention.

The above honeycomb structure comprising hexagonal cells and having a diameter of 93 mm, a thickness of 25 mm, a wall thickness of 0.1 mm and a cell density of 450 cells/in² was subjected to a grinding treatment by the use of a band saw, whereby six slits 12 were formed in the honeycomb structure in a direction parallel to the axis of each passage of the honeycomb structure such that seven (7) cells were present between adjacent slits and that the resistance of the resulting heater became 50 mΩ, as shown in FIG. 25.

Next, the heater was coated with the same catalyst layer as used in the catalyst I and was provided with a pair of electrodes 11. Then, the heater was placed in a can made of stainless steel so that the heater was insulated from the can. The effective volume of the finally-obtained heater was 0.13 l.

Assembling of exhaust gas purification systems

The following exhaust gas purification systems were assembled using the above-obtained adsorbent-catalysts, adsorbents, catalysts and electrical heater. In order to distinguish the Roman figures indicating the kinds of the adsorbent-catalysts, adsorbents and catalysts from the Arabian figures used in FIGS. 11 to 24, the Arabian figures were shown in the following by placing them in parentheses.

System A

Figure 11:
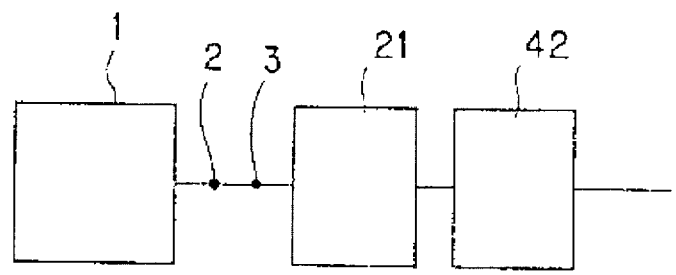
FIG. 11 to FIG. 24 are each an example of the system for exhaust gas purification according to the present invention.

As shown in FIG. 11, in the flow path of an exhaust gas from an engine (1) were placed the adsorbent-catalyst I (21) at an upstream site and the catalyst II (42) downstream of the adsorbent-catalyst I (21). Between the engine (1) and the adsorbent-catalyst I (21) were provided an $O_2$ sensor (2) for A/F adjustment at an upstream site and a hole (3) for secondary air feeding for ignition acceleration, downstream of the $O_2$ sensor (2). The distance from the engine manifold outlet to the adsorbent-catalyst I (21) was 600 mm, and the space between the adsorbent-catalyst I (21) and the catalyst II (42) was 30 mm. Further, the catalyst III (not shown in FIG. 11) was placed at a site 1,200 mm apart from the engine manifold outlet.

System B

Figure 12:
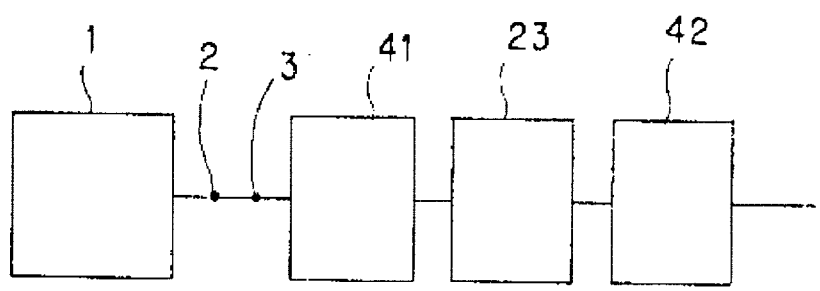

As shown in FIG. 12, in the flow path of an exhaust gas from an engine (1) were placed the catalyst I (41), the adsorbent-catalyst III (23) and the catalyst II (42) in this order from the engine (1) side. Between the engine (1) and the catalyst I (41) were provided an $O_2$ sensor (2) for A/F adjustment at an upstream site and a hole (3) for secondary air-feeding for ignition acceleration, downstream of the $O_2$ sensor (2). The distance from the engine manifold outlet to the catalyst I (41) was 600 mm, and the spaces between the catalyst I (41) and the adsorbent-catalyst III (23) and between the adsorbent-catalyst III (23) and the catalyst II (42) were each 30 mm. Further, the catalyst III (not shown in FIG. 12) was placed at a site 1,200 mm apart from the engine manifold outlet.

System C

Figure 13:
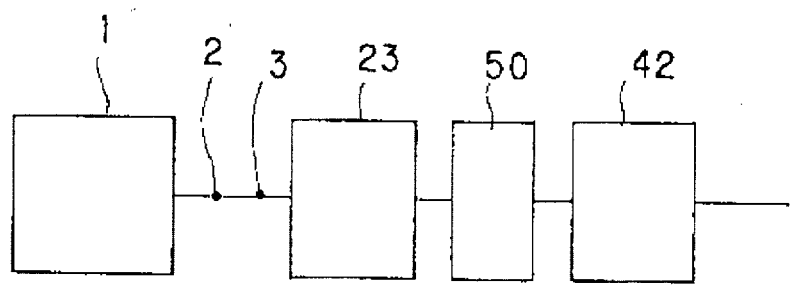

As shown in FIG. 13, in the flow path of an exhaust gas from an engine (1) were placed the adsorbent-catalyst III (23), the electrical heater (50) and the catalyst II (42) in this order from the engine (1) side. Between the engine (1) and the adsorbent-catalyst III (23) were provided an $O_2$ sensor (2) for A/F adjustment at an upstream site and a hole (3) for secondary air-feeding for ignition acceleration, downstream of the $O_2$ sensor (2). The distance from the engine manifold outlet to the adsorbent-catalyst III (23) was 600 mm, and the spaces between the adsorbent-catalyst III (23) and the electrical heater (50) and between the electrical heater (50) and the catalyst II (42) were each 30 mm. Further, the catalyst III (not shown in FIG. 13) was placed at a site 1,200 mm apart from the engine manifold outlet.

System D

Figure 14:
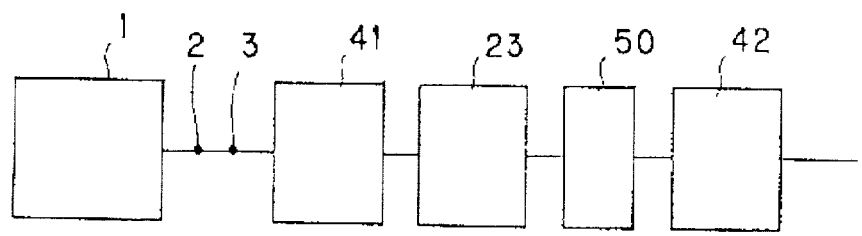

This system was assembled in the same manner as the system C except that the catalyst I (41) was placed between the secondary air-feeding hole (3) and the adsorbent-catalyst III (23), as shown in FIG. 14. The distance from the engine manifold outlet to the catalyst I (41) was 600 mm, and the space between the catalyst I (41) and the adsorbent-catalyst III (23) was 30 mm.

System E

Figure 15:
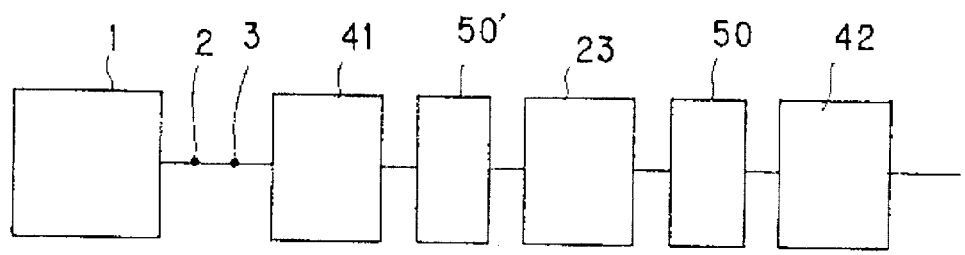

This system was assembled in the same manner as the system D except that another electrical heater (50') was placed between the catalyst I (41) and the adsorbent-catalyst III (23), as shown in FIG. 15. The spaces between the catalyst I (41) and the electrical heater (50') and between the electrical heater (50') and the adsorbent-catalyst III (23) were each 30 mm.

System F

Figure 16:
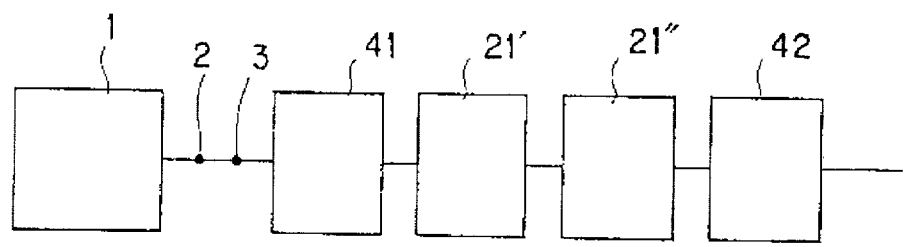

As shown in FIG. 16, in the flow path of an exhaust gas from an engine was placed the catalyst I (41) at an upstream site; and downstream thereof were placed an adsorbent-catalyst I' (21') and an adsorbent-catalyst I" (21") adjacently to each other (these two adsorbent-catalysts were produced by equally dividing the adsorbent-catalyst I perpendicularly to its passage direction). Further downstream was placed the catalyst II (42). Between the engine (1) and the catalyst I (41) were provided an $O_2$ sensor (2) for A/F adjustment at an upstream site and a hole (3) for secondary air-feeding for ignition acceleration, downstream of the $O_2$ sensor (2). The distance from the engine manifold outlet to the catalyst I (41) was 600 mm, and the spaces between the catalyst I (41) and the adsorbent-catalyst I' (21'), between the adsorbent-catalyst I' (21') and the adsorbent-catalyst I" (21") and between the adsorbent-catalyst I" (21") and the catalyst II (42) were each 30 mm. Further, the catalyst III (not shown in FIG. 16) was placed at a site 1,200 mm apart from the engine manifold outlet.

System G

Figure 17:
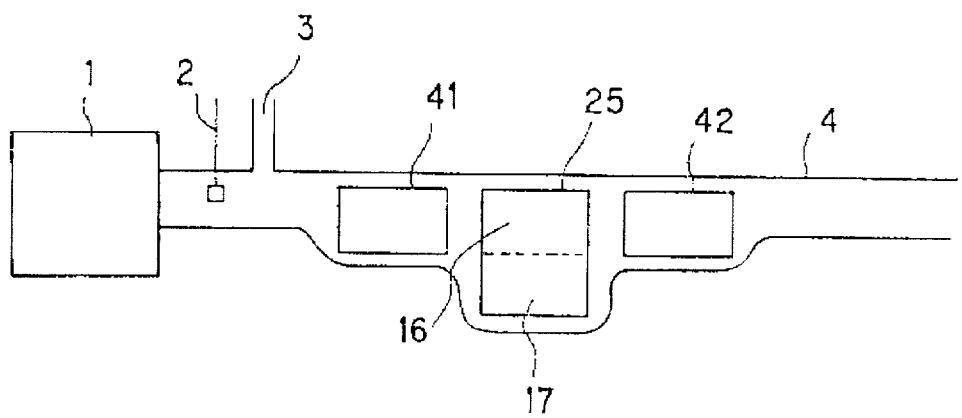

As shown in FIG. 17, in the flow path of an exhaust gas from an engine (1) were placed the catalyst I (41), the adsorbent-catalyst V (25) and the catalyst (II) (42) in this order from the engine (1) side. An exhaust pipe (4) had an inside diameter of 50 mm but was expanded at its lower side at the portions where the catalyst I (41), the adsorbent-catalyst V (25) and the catalyst II (42) were placed. The adsorbent-catalyst V (25) was placed so that the upper side was the catalyst portion (16) and the lower side was the adsorbent portion (17). Between the engine (1) and the catalyst I (41) were provided an $O_2$ sensor (2) for A/F adjustment at an upstream site and a hole (3) for secondary airfeeding for ignition acceleration, downstream of the $O_2$ sensor (2). The distance from the engine manifold outlet to the catalyst I (41) was 600 mm, and the spaces between the catalyst I (41) and the adsorbent-catalyst V (25) and between the adsorbent-catalyst V (25) and the catalyst II (42) were each 30 mm. Further, the catalyst III (not shown in FIG. 17) was placed at a site 1,200 mm apart from the engine manifold outlet.

System H

Figure 18:
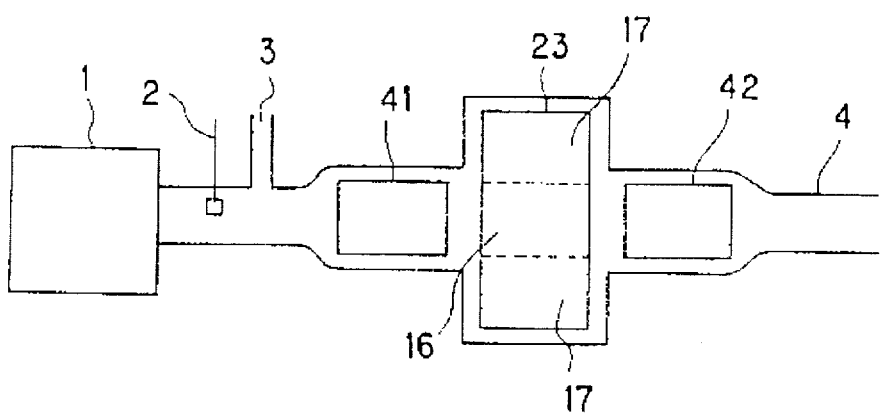

As shown in FIG. 18, in the flow path of an exhaust gas from an engine (1) were placed the catalyst I (41), the adsorbent-catalyst III (23) and the catalyst (II) (42) in this order from the engine (1) side. The inside diameter of an exhaust pipe (4) was sharply constricted in front of and at the back of the adsorbent-catalyst III (23); the spaces between (1) each end of the adsorbent portion (17) constituting the outer portion of the adsorbent-catalyst III (23) and (2) the inner wall of the exhaust pipe (4) was 10 mm; thereby, the flow of the exhaust gas through the adsorption portion (17) was difficult as compared with the gas flow through the catalyst portion (16) constituting the inner portion of the adsorbent-catalyst III (23). Between the engine (1) and the catalyst I (41) were provided an $O_2$ sensor (2) for A/F adjustment at an upstream site and a hole (3) for secondary air-feeding for ignition acceleration, downstream of the $O_2$ sensor (2). The distance from the engine manifold outlet to the catalyst I (41) was 600 mm, and the spaces between the catalyst I (41) and the adsorbent-catalyst III (23) and between the adsorbent-catalyst III (23) and the catalyst II (42) were each 30 mm. Further, the catalyst III (not shown in FIG. 18) was placed at a site 1,200 mm apart from the engine manifold outlet.

System I

Figure 19:
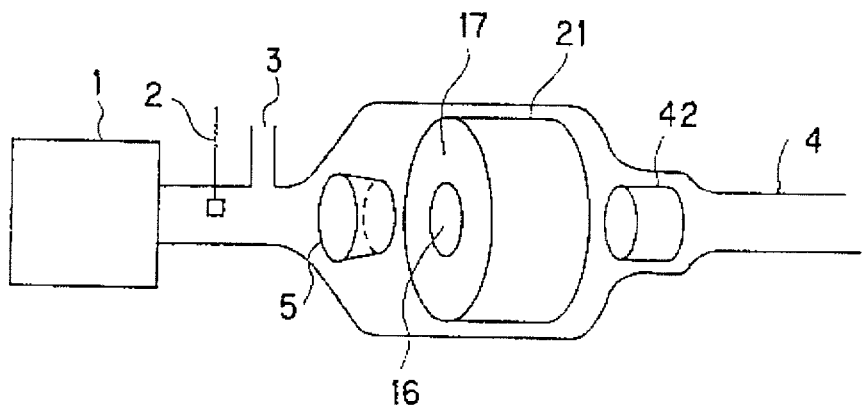

As shown in FIG. 19, in the flow path of an exhaust gas from an engine (1) were placed the adsorbent-catalyst I (21) and the catalyst II (42) in this order from the engine (1) side. Inside an exhaust pipe (4) and in front (upstream) of the adsorbent-catalyst I (21) was placed a guide (5) for exhaust gas flow so that the exhaust gas flow was constricted by the guide and the flow amount of exhaust gas through the catalyst portion (16) constituting the central portion of the adsorbent-catalyst I (21) became larger than that through the adsorbent portion (17) constituting the outer portion of the adsorbent-catalyst I (21). Between the engine (1) and the adsorbent-catalyst I (21) were provided an $O_2$ sensor (2) for A/F adjustment at an upstream site and a hole (3) for secondary air-feeding for ignition acceleration, downstream of the $O_2$ sensor (2). The distance from the engine manifold outlet to the adsorbent-catalyst I (21) was 600 mm, and the space between the adsorbent-catalyst I (21) and the catalyst II (42) was 30 mm. Further, the catalyst III (not shown in FIG. 19) was placed at a site 1,200 mm apart from the engine manifold outlet.

System J

Figure 20:
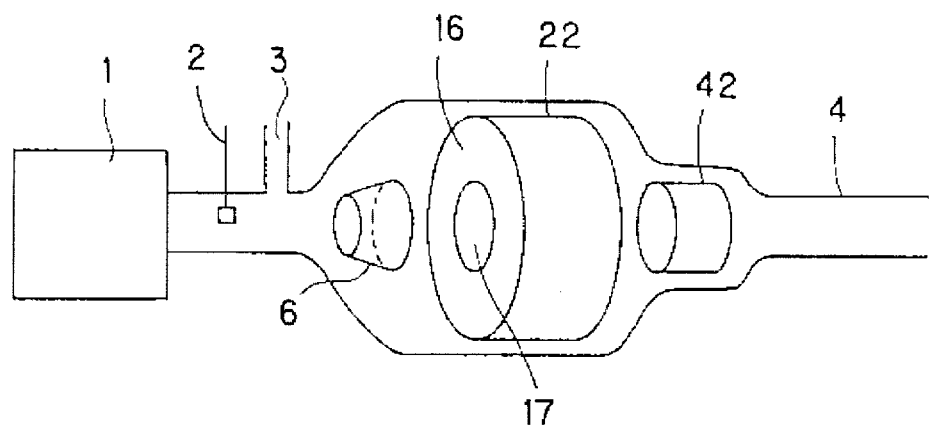

As shown in FIG. 20, this system was assembled in the same manner as the system I except that the adsorbent-catalyst II (22) was used in place of the adsorbent-catalyst I of the system I and that a guide (6) for exhaust gas flow was placed in an exhaust pipe (4) and in front (upstream) of the adsorbent-catalyst II (22) so that the flow amount of exhaust gas through the catalyst portion (16) constituting the outer portion of the adsorbent-catalyst II (22) became larger than that through the adsorbent portion (17) constituting the central portion of the adsorbent-catalyst II (22).

System K

Figure 21:
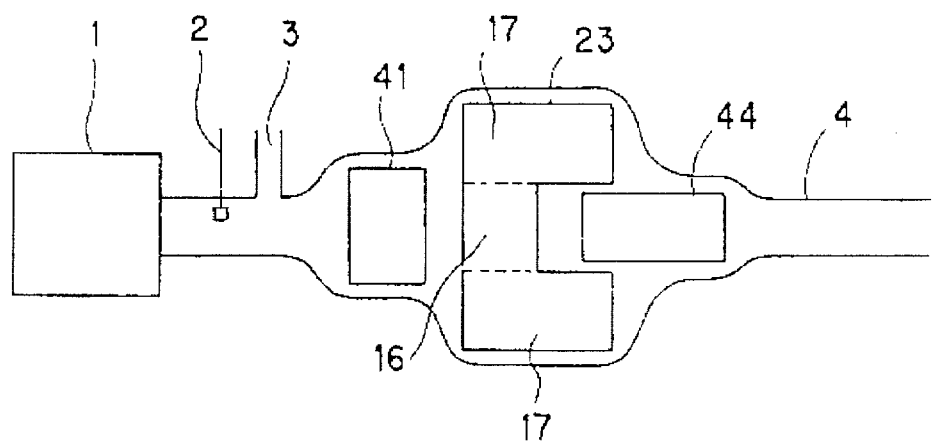

As shown in FIG. 21, in the flow path of an exhaust gas from an engine (1) were placed the catalyst I (41), the adsorbent-catalyst III (23) and the catalyst IV (44) in this order from the engine (1) side. The adsorbent-catalyst (23) was placed so that its one end from which a cylindrical hollow portion extended toward the interior of the adsorbent-catalyst III (23) was adjacent to the catalyst IV (44), and the catalyst IV (44) was placed in such a state that its 20-mm front portion was inserted into the hollow portion of the adsorbent-catalyst III (23). An exhaust pipe (4) was made so that the whole HC desorbed from the adsorbent portion (17) of the adsorbent-catalyst III (23) could flow back toward the front end of the catalyst IV (44) and then pass therethrough. Between the engine (1) and the catalyst I (41) were provided an $O_2$ sensor (2) for A/F adjustment at an upstream site and a hole (3) for secondary air-feeding for ignition acceleration, downstream of the $O_2$ sensor (2). The distance from the engine manifold outlet to the catalyst I (41) was 600 mm, and the spaces between the catalyst I (41) and the adsorbent-catalyst III (23) and between the adsorbent-catalyst III (23) and the catalyst IV (44) were each 30 mm. Further, the catalyst III (not shown in FIG. 21) was placed at a site 1,200 mm apart from the engine manifold outlet.

System L

Figure 22:
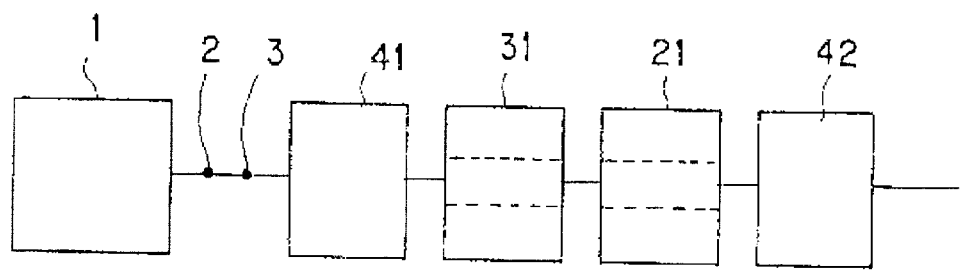

As shown in FIG. 22, in the flow path of an exhaust gas from an engine (1) were placed the catalyst I (41), the adsorbent I (31), the adsorbent-catalyst I (21) and the catalyst II (42) in this order from the engine (1) side. Between the engine (1) and the catalyst I (41) were provided an $O_2$ sensor (2) for A/F adjustment at an upstream site and a hole (3) for secondary air feeding for ignition acceleration, downstream of the $O_2$ sensor (2). The distance from the engine manifold outlet to the catalyst I (41) was 600 mm, and the spaces between the catalyst I (41) and the adsorbent I (31), between the adsorbent I (31) and the adsorbent-catalyst I (21) and between the adsorbent-catalyst I (21) and the catalyst II (42) were each 30 mm. Further, the catalyst III (not shown in FIG. 22) was placed at a site 1,200 mm apart from the engine manifold outlet.

System M

Figure 23:
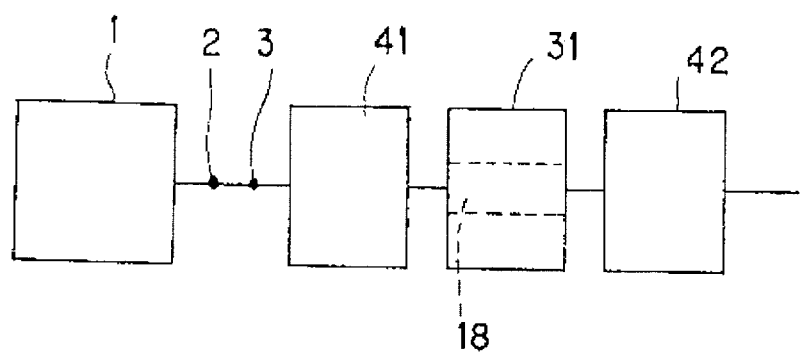

This system was assembled in the same manner as the system B except that the adsorbent I (31) having a blowing-through portion (18) in the central portion was used in place of the adsorbent-catalyst III of the system B, as shown in FIG. 23.

System N

Figure 24:
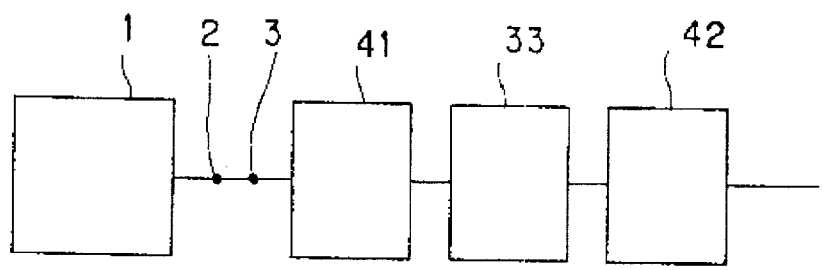

This system was assembled in the same manner as the system B except that the adsorbent III (33) having two parallel blowing-through portions perpendicular to the axial direction of the passages of the honeycomb structure constituting the adsorbent III (33) was used in place of the adsorbent-catalyst III of the system B, as shown in FIG. 24. The adsorbent III (33) was placed in an exhaust pipe so that the axial direction of each blowing-through portion became parallel to the flow direction of exhaust gas, and the two ends of each passage were made open so that part of the exhaust gas could flow from the blowing-through portions to the passages.

Evaluations of exhaust gas purification systems

In order to evaluate the exhaust gas purification performances of the systems A to N, an FTP test (LA-4 mode) was conducted by the use of a test car on which a 4-cylinder engine having a displacement of 2,000 cc was mounted. In this case, secondary air was fed through the hole 3 of each system in a simple manner using an air pump at a rate of 100 l/min for 90 seconds after engine cranking to obtain an oxygen-excessive exhaust gas. In the systems having an electrical heater, an electric power (2 KW) was applied to the electrical heater for 30 seconds after 30 seconds from engine cranking, by the use of a 12-V battery.

The exhaust gas generated was collected by a CVS method, and its emission value was then calculated. The test results are shown in Table 1.

TABLE 1

| System | HC emission | |
|---|---|---|
| | Bag 1A (g) | Total (g/mile) |
| A | 0.88 | 0.064 |
| B | 0.51 | 0.042 |
| C | 0.36 | 0.033 |
| D | 0.35 | 0.030 |
| E | 0.33 | 0.028 |
| F | 0.85 | 0.057 |
| G | 0.79 | 0.053 |
| H | 0.48 | 0.040 |
| I | 0.92 | 0.066 |
| J | 0.93 | 0.070 |
| K | 0.54 | 0.045 |
| L | 0.50 | 0.044 |
| M | 0.65 | 0.048 |
| N | 0.71 | 0.051 |

[Measurement of temperature distribution]

In the above FTP test using the system C, each one K thermocouple was fitted at three positions A, B and C, i.e. a position A of the catalyst portion of the adsorbent-catalyst III which was 10 mm inside from the inlet side end, a position B of the adsorbent portion of the adsorbent-catalyst III which was 10 mm inside from the outlet side end, and a position C of the catalyst II which was 10 mm inside from the inlet side end. The temperature distribution between these three positions at the start of the FTP test was measured; that is, the temperatures of the positions B and C were measured when the temperature of the position A reached 100° C., 200° C. and 300° C. The results are shown in Table 2. As is apparent from Table 2, the temperature of the outlet of the adsorbent portion of the adsorbent-catalyst III (upstream) is lower than the temperature of the inlet of the catalyst II (downstream).

TABLE 2

| Position A | Position B | Position C |
|---|---|---|
| 100° C. | 58° C. | 72° C. |
| 200° C. | 76° C. | 125° C. |
| 300° C. | 94° C. | 206° C. |

As stated above, the present invention enables efficient purification of the harmful components present in the exhaust gas emitted from an internal combustion engine, particularly the HC generated in a large amount during the cold start of the engine.

What is claimed is:

1. An adsorbent-catalyst structure for purifying exhaust gas, comprising:

a honeycomb structure having a plurality of partition walls defining passages extending along an axial direction of the honeycomb structure, said partition walls forming at least two portions including a catalyst-supporting portion and an adsorbent-supporting portion that are separate from each other in a cross-section extending perpendicular to said axial direction;

an adsorbent layer for adsorbing hydrocarbons in exhaust gas, provided on said adsorbent-supporting portion; and a catalyst layer provided separately from said adsorbent layer, on said catalyst-supporting portion.

2. The adsorbent-catalyst structure of claim 1, wherein a cross-sectional area of said catalyst-supporting portion is 5–80% of a cross-sectional area of said honeycomb structure.

3. The adsorbent-catalyst structure of claim 1, wherein said adsorbent-supporting portion has a heat capacity that is larger than a heat capacity of said catalyst-supporting portion.

4. The adsorbent-catalyst structure of claim 1, wherein said catalyst-supporting portion has a length extending along said axial direction of the honeycomb structure that is shorter than a length of said adsorbent-supporting portion extending along said axial direction of the honeycomb structure.

5. The adsorbent-catalyst structure of claim 1, wherein said catalyst-supporting portion has an open frontal area and said adsorbent-supporting portion has an open frontal area, wherein the open frontal area of the catalyst-supporting portion is larger than the open frontal area of the adsorbent-supporting portion.

6. The adsorbent-catalyst structure of claim 1, wherein said adsorbent-supporting portion supports a catalyst component.

7. The adsorbent-catalyst structure of claim 6, wherein said catalyst component forms a layer.

8. The adsorbent-catalyst structure of claim 1, wherein said adsorbent layer comprises zeolite.

9. The adsorbent-catalyst structure of claim 8, wherein said zeolite has an Si/Al molar ratio of not less than 40.

10. The adsorbent-catalyst structure of claim 8, wherein said zeolite contains at least one noble metal selected from the group consisting of Pt, Pd and Rh.

11. The adsorbent-catalyst structure of claim 8, wherein said zeolite contains at least one ion selected from the group consisting of Cu, Ag and Au ions.

12. The adsorbent-catalyst structure of claim 11, wherein said zeolite contains not less than 20% of said at least one ion based on Al of said zeolite.

13. The adsorbent-catalyst structure of claim 11, wherein said zeolite further contains at least one ion selected from the group consisting of Mg, Ca, Sr, Ba, Y, La, Ti, Ce, Mn, Fe, Cr, Ni and Zn ions.

14. The adsorbent-catalyst structure of claim 1, wherein said catalyst layer contains at least one noble metal selected from the group consisting of Pt, Pd and Rh.

15. An exhaust gas purification system, comprising:

an adsorbent-catalyst structure including (i) a honeycomb structure provided in an exhaust gas pipe, said honeycomb structure having a plurality of partition walls defining passages extending along an axial direction of the honeycomb structure, said partition walls forming at least two portions including a catalyst-supporting portion and an adsorbent-supporting portion that are separate from each other in a cross-section extending perpendicular to said axial direction, (ii) an adsorbent layer for adsorbing hydrocarbons in exhaust gas provided on said adsorbent-supporting portion, and (iii) a catalyst layer provided separately from said adsorbent layer, on said catalyst-supporting portion; and a first catalyst structure comprising a honeycomb structure supporting a catalyst layer, provided in the exhaust gas pipe downstream of the adsorbent-catalyst structure.

16. The system of claim 15, further comprising a second catalyst structure comprising a honeycomb structure supporting a catalyst layer, provided in the exhaust gas pipe upstream of the adsorbent-catalyst structure.

17. The system of claim 15, further comprising an electric heater provided between the adsorbent-catalyst structure and the first catalyst structure.

18. The system of claim 16, further comprising an electric heater provided at at least one location from the group consisting of between the adsorbent-catalyst structure and the first catalyst structure, and upstream of the second catalyst structure.

19. The system of claim 15, further comprising means for flowing a larger proportion of exhaust gas through the catalyst-supporting portion of the adsorbent-catalyst structure with respect to the adsorbent-supporting portion of the adsorbent-catalyst structure.

20. The system of claim 15, further comprising an adsorbent structure provided in the exhaust gas pipe upstream of the first catalyst structure, said adsorbent structure comprising (i) a honeycomb structure including a through-passage portion having a plurality of partition walls defining passages extending along an axial direction of the honeycomb structure, and an open blow-through portion for free passage of exhaust gas, and (ii) an adsorbent layer for adsorbing hydrocarbons in exhaust gas, supported on the partition walls.

21. An adsorbent structure consisting essentially of:

a honeycomb structure including a through-passage portion having a plurality of partition walls defining passages extending along an axial direction of the honeycomb structure, and an open blow-through portion for free passage of exhaust gas through the honeycomb structure, said through-passage portion and said blow-through portion extending from an open frontal face of the honeycomb structure to permit simultaneous exhaust gas flow through both portions; and an adsorbent layer for adsorbing hydrocarbons in exhaust gas, supported on the partition walls.

22. The adsorbent structure of claim 21, wherein said blow-through portion extends parallel to the axial direction of the honeycomb structure.

23. The adsorbent structure of claim 21, wherein the adsorbent layer further includes a catalyst component.

24. The adsorbent structure of claim 23, wherein said catalyst component forms a layer.

25. The adsorbent structure of claim 21, wherein the adsorbent layer comprises zeolite.

26. The adsorbent structure of claim 25, wherein said zeolite has an Si/Al molar ratio of not less than 40.

27. The adsorbent structure of claim 25, wherein said zeolite contains at least one noble metal selected from the group consisting of Pt, Pd and Rh.

28. The adsorbent structure of claim 25, wherein said zeolite contains at least one ion selected from the group consisting of Cu, Ag and Au ions.

29. The adsorbent structure of claim 28, wherein said zeolite contains not less than 20% of said at least one ion based on Al in the zeolite.

30. The adsorbent structure of claim 28, wherein said zeolite further contains at least one ion selected from the group consisting of Mg, Ca, Sr, Ba, Y, La, Ti, Ce, Mn, Fe, Cr, Ni and Zn ions.

31. An adsorbent structure, comprising:

a honeycomb structure including a through-passage portion having a plurality of partition walls defining passages extending along an axial direction of the honeycomb structure, and an open blow-through portion for free passage of exhaust gas through the honeycomb structure, said open blow-through portion extending at an angle with respect to the axial direction and intersecting planes of the partition walls; and an adsorbent layer for adsorbing hydrocarbons in exhaust gas, supported on the partition walls.

32. The adsorbent structure of claim 31, wherein the adsorbent layer further includes a catalyst component.

33. The adsorbent structure of claim 32, wherein said catalyst component forms a layer.

34. The adsorbent structure of claim 31, wherein the adsorbent layer comprises zeolite.

35. The adsorbent structure of claim 34, wherein said zeolite has an Si/Al molar ratio of not less than 40.

36. The adsorbent structure of claim 34, wherein said zeolite contains at least one noble metal selected from the group consisting of Pt, Pd and Rh.

37. The adsorbent structure of claim 34, wherein said zeolite contains at least one ion selected from the group consisting of Cu, Ag and Au ions.

38. The adsorbent structure of claim 37, wherein said zeolite contains not less than 20% of said at least one ion based on Al in the zeolite.

39. The adsorbent structure of claim 37, wherein said zeolite further contains at least one ion selected from the group consisting of Mg, Ca, Sr, Ba, Y, La, Ti, Ce, Mn, Fe, Cr, Ni and Zn ions.

40. The adsorbent structure of claim 31, wherein the passages open into the blow-through portion.

41. An exhaust gas purification system, comprising:

an adsorbent structure provided in an exhaust gas pipe, said adsorbent structure comprising (i) a honeycomb structure including a through-passage portion having a plurality of partition walls defining passages extending along an axial direction of the honeycomb structure, and an open blow-through portion for free passage of exhaust gas, said adsorbent structure being provided in the exhaust gas pipe for simultaneous flow of exhaust gas through both portions, and (ii) an adsorbent layer for absorbing hydrocarbons in exhaust gas, supported on the partition walls; and a first catalyst structure comprising a honeycomb structure supporting a catalyst layer, provided in the exhaust gas pipe downstream of the adsorbent structure.

42. The system of claim 41, further comprising a second catalyst structure comprising a honeycomb structure supporting a catalyst layer, provided upstream of the adsorbent structure.

43. The system of claim 41, further comprising an electric heater provided between the adsorbent structure and the first catalyst structure.

44. The system of claim 42, further comprising an electric heater provided at at least one position from the group consisting of between the adsorbent structure and the first catalyst structure, and upstream of the second catalyst structure.

45. A method of purifying exhaust gas comprising the steps of:

providing the exhaust gas purification system of claim 15;

flowing the exhaust gas from cold start of an internal combustion engine into the system, whereby the adsorbent layer of the adsorbent-catalyst structure adsorbs hydrocarbons from the exhaust gas;

desorbing adsorbed hydrocarbons from the adsorbent layer as a temperature of the adsorbent layer increases by increasing temperature of the exhaust gas;

adding an oxidizing gas to the exhaust gas or adjusting a ratio of combustion air to fuel fed to the internal combustion engine, to make the exhaust gas oxygen-excessive;

burning desorbed hydrocarbons on the catalyst layer of the adsorbent-catalyst structure or the first catalyst structure of the system.

46. A method of purifying exhaust gas comprising the steps of:

providing the exhaust gas purification system of claim 41;

flowing the exhaust gas from cold start of an internal combustion engine into the system, whereby the adsorbent layer of the adsorbent structure adsorbs hydrocarbons from the exhaust gas;

desorbing adsorbed hydrocarbons from the adsorbent layer as a temperature of the adsorbent layer increases by increasing temperature of the exhaust gas;

adding an oxidizing gas to the exhaust gas or adjusting a ratio of combustion air to fuel fed to the internal combustion engine, to make the exhaust gas oxygen-excessive;

burning desorbed hydrocarbons on the catalyst layer of the first catalyst structure of the system.

* * * * *